(12) United States Patent
Wood et al.

(10) Patent No.: US 7,869,988 B2
(45) Date of Patent: Jan. 11, 2011

(54) GROUP FOREIGN LANGUAGE TEACHING SYSTEM AND METHOD

(75) Inventors: Michael C. Wood, Ross, CA (US); Jonathan Ram Dariyanani, Fredericksburg, VA (US)

(73) Assignee: K12 Inc., Herndon, VA (US)

( * ) Notice: Subject to any disclaimer, the term of this patent is extended or adjusted under 35 U.S.C. 154(b) by 996 days.

(21) Appl. No.: 11/592,682

(22) Filed: Nov. 3, 2006

(65) Prior Publication Data
US 2008/0109207 A1    May 8, 2008

(51) Int. Cl.
G06F 17/20 (2006.01)
G09B 19/06 (2006.01)
G09B 19/00 (2006.01)
G09B 5/00 (2006.01)

(52) U.S. Cl. ............................ 704/8; 434/156; 434/157; 434/169

(58) Field of Classification Search .................. None
See application file for complete search history.

(56) References Cited

U.S. PATENT DOCUMENTS

| | | |
|---|---|---|
| 3,670,427 A | 6/1972 | Stolpen |
| 3,968,576 A | 7/1976 | Taylor |
| 4,406,626 A | 9/1983 | Anderson et al. |
| 4,541,069 A | 9/1985 | Kanou et al. |
| 4,618,985 A | 10/1986 | Pfeiffer |
| 4,633,435 A | 12/1986 | Morimoto et al. |
| 4,706,212 A | 11/1987 | Toma |
| 4,787,038 A | 11/1988 | Doi et al. |
| 4,804,328 A | 2/1989 | Barrabee |
| 4,884,972 A | 12/1989 | Gasper |
| 5,010,495 A | 4/1991 | Willetts |
| 5,178,542 A | 1/1993 | Chigrinsky et al. |
| 5,203,705 A | 4/1993 | Hardy et al. |
| 5,318,450 A | 6/1994 | Carver |
| 5,486,111 A | 1/1996 | Watkins |
| 5,503,560 A | 4/1996 | Stentiford |
| 5,602,982 A | 2/1997 | Judd et al. |
| 5,649,826 A | 7/1997 | West et al. |
| 5,692,906 A | 12/1997 | Corder |
| 5,727,950 A | 3/1998 | Cook et al. |

(Continued)

FOREIGN PATENT DOCUMENTS

AU    2004203222 A1 *    2/2005

(Continued)

OTHER PUBLICATIONS

"An Interactive Video Program: TOPIC (Training for Oral Proficiency Interviewing Competence)," Gaby West Training and Traning Design, Calico Journal, vol. 6, No. 3, Mar. 1989.

(Continued)

Primary Examiner—Matthew J Sked

(57) ABSTRACT

A method and system for teaching a foreign language to a user who has knowledge of a base language is disclosed. The method and system may include delivering a video presentation simultaneously to a plurality of users. The method and system may also include simultaneously delivering a plurality of mixed known language-foreign language audio and/or text streams to the plurality of users, each of the plurality of mixed known language-foreign language audio and/or text streams corresponding to the video presentation.

29 Claims, 23 Drawing Sheets

U.S. PATENT DOCUMENTS

| | | | |
|---|---|---|---|
| 5,788,504 A | 8/1998 | Rice et al. | |
| 5,823,788 A | 10/1998 | Lemelson et al. | |
| 5,882,202 A | 3/1999 | Sameth et al. | |
| 5,904,485 A | 5/1999 | Siefert | |
| 5,930,746 A | 7/1999 | Ting | |
| 6,017,219 A | 1/2000 | Adams, Jr. et al. | |
| 6,022,221 A | 2/2000 | Boon | |
| 6,039,575 A | 3/2000 | L'Allier et al. | |
| 6,064,856 A | 5/2000 | Lee et al. | |
| 6,077,085 A | 6/2000 | Parry et al. | |
| 6,097,381 A | 8/2000 | Scott et al. | |
| 6,141,528 A * | 10/2000 | Remschel | 434/350 |
| 6,146,148 A | 11/2000 | Stuppy | |
| 6,149,441 A | 11/2000 | Pellegrino et al. | |
| 6,186,794 B1 | 2/2001 | Brown et al. | |
| 6,234,802 B1 | 5/2001 | Pella et al. | |
| 6,285,993 B1 | 9/2001 | Ferrell | |
| 6,293,801 B1 | 9/2001 | Jenkins et al. | |
| 6,301,462 B1 | 10/2001 | Freeman et al. | |
| 6,305,942 B1 | 10/2001 | Block et al. | |
| 6,341,958 B1 | 1/2002 | Zilberman | |
| 6,347,943 B1 | 2/2002 | Fields et al. | |
| 6,438,515 B1 | 8/2002 | Crawford et al. | |
| 6,482,011 B1 | 11/2002 | Lee et al. | |
| 6,554,618 B1 | 4/2003 | Lockwood | |
| 6,633,742 B1 | 10/2003 | Turner et al. | |
| 6,643,493 B2 | 11/2003 | Kilgore | |
| 6,729,885 B2 | 5/2004 | Stuppy et al. | |
| 6,736,641 B2 | 5/2004 | Quiroz | |
| 6,755,657 B1 | 6/2004 | Wasowicz | |
| 6,775,518 B2 * | 8/2004 | Norcott et al. | 434/350 |
| 6,865,368 B2 | 3/2005 | Hoyashita et al. | |
| 6,871,043 B2 | 3/2005 | Sanda | |
| 6,884,074 B2 | 4/2005 | Theilmann | |
| 6,905,341 B1 | 6/2005 | Whitaker et al. | |
| 6,909,874 B2 | 6/2005 | Holtz et al. | |
| 6,996,366 B2 | 2/2006 | L'Allier et al. | |
| 6,999,954 B2 | 2/2006 | Taggart et al. | |
| 7,043,193 B1 | 5/2006 | Vashi et al. | |
| 7,050,753 B2 | 5/2006 | Knutson | |
| 7,052,277 B2 | 5/2006 | Kellman | |
| 7,052,278 B2 | 5/2006 | Johnson et al. | |
| 7,085,707 B2 | 8/2006 | Milner | |
| 7,137,821 B2 | 11/2006 | Jorgensen et al. | |
| 7,210,938 B2 | 5/2007 | Packard et al. | |
| 7,260,355 B2 | 8/2007 | L'Allier et al. | |
| RE39,942 E | 12/2007 | Fai et al. | |
| 2001/0023059 A1 | 9/2001 | Toki | |
| 2001/0041330 A1 | 11/2001 | Brown et al. | |
| 2002/0058234 A1 | 5/2002 | West et al. | |
| 2002/0106615 A1 | 8/2002 | Murray et al. | |
| 2002/0164564 A1 | 11/2002 | Fretwell, Jr. | |
| 2003/0004702 A1 | 1/2003 | Higinbotham | |
| 2003/0040899 A1 | 2/2003 | Ogilvie | |
| 2003/0049593 A1 | 3/2003 | Parmer et al. | |
| 2003/0064354 A1 | 4/2003 | Lewis | |
| 2003/0077559 A1 | 4/2003 | Braunberger et al. | |
| 2003/0157468 A1 | 8/2003 | Kasahara | |
| 2003/0165800 A1 | 9/2003 | Shaw et al. | |
| 2003/0203343 A1 | 10/2003 | Milner | |
| 2004/0018479 A1 | 1/2004 | Pritchard et al. | |
| 2004/0023191 A1 | 2/2004 | Brown et al. | |
| 2004/0030781 A1 | 2/2004 | Etesse et al. | |
| 2004/0115597 A1 | 6/2004 | Butt | |
| 2004/0214152 A1 | 10/2004 | Hoyashita et al. | |
| 2004/0214153 A1 | 10/2004 | McCormick et al. | |
| 2005/0032027 A1 | 2/2005 | Patton et al. | |
| 2005/0053900 A1 | 3/2005 | Kaufmann | |
| 2005/0084829 A1 | 4/2005 | Peters | |
| 2005/0149316 A1 | 7/2005 | Ushioda et al. | |
| 2005/0175970 A1 | 8/2005 | Dunlap et al. | |
| 2005/0196733 A1 | 9/2005 | Budra et al. | |
| 2005/0255431 A1 * | 11/2005 | Baker | 434/169 |
| 2006/0019223 A1 | 1/2006 | Wood et al. | |
| 2006/0110711 A1 | 5/2006 | Julia et al. | |
| 2006/0115800 A1 | 6/2006 | Daley | |
| 2006/0195313 A1 | 8/2006 | Voetberg et al. | |
| 2008/0057480 A1 | 3/2008 | Packard et al. | |
| 2008/0059145 A1 | 3/2008 | Wood et al. | |
| 2008/0059484 A1 | 3/2008 | Packard et al. | |

FOREIGN PATENT DOCUMENTS

| | | |
|---|---|---|
| DE | 4018080 A1 | 12/1991 |
| EP | 1482469 A2 | 12/2004 |
| JP | 2-178688 | 7/1990 |
| JP | 2002229440 A * | 8/2002 |

OTHER PUBLICATIONS

"Thomson ELT Interactive Picture Dictionar CD-ROM Selected as Finalist for 2006 SIII Codie Awards; Heinle Picture Dictionary Interactive CD-ROM recognized among Best Instructional Solutions for English Language Acquisition," Feb. 13, 2006.

"Nova Development Announces New Berlitz Branded Foreign Language Software Programs Now Available in Spanish, French, German, and Italian; Complete Language Learning Solutions Provide Three Ways to Learn: Computer, Car, iPod," Nova, Development Corporation, online, [Jul. 11, 2006], http://www.businesswire.com.

"Book of Mormon stories diglot reader on computer," Neal S. Harmon, 2002, pp. 22-37.

"The Effect of a Video Diglot-Weave Method in Introducing Beginning Languages," Phyllis Gunderson, Masters Thesis Presented to the Dept. of Linguistics, Brigham Young University, Dec. 1993.

"A brand new world for English instruction with interactive multimedia and the World Wide Web," Yuangshan Chuang, Jul. 1998, ACM SIGCUE Outlook.

Office Action for U.S. Appl. No. 11/508,032, issued Nov. 18, 2009.

* cited by examiner

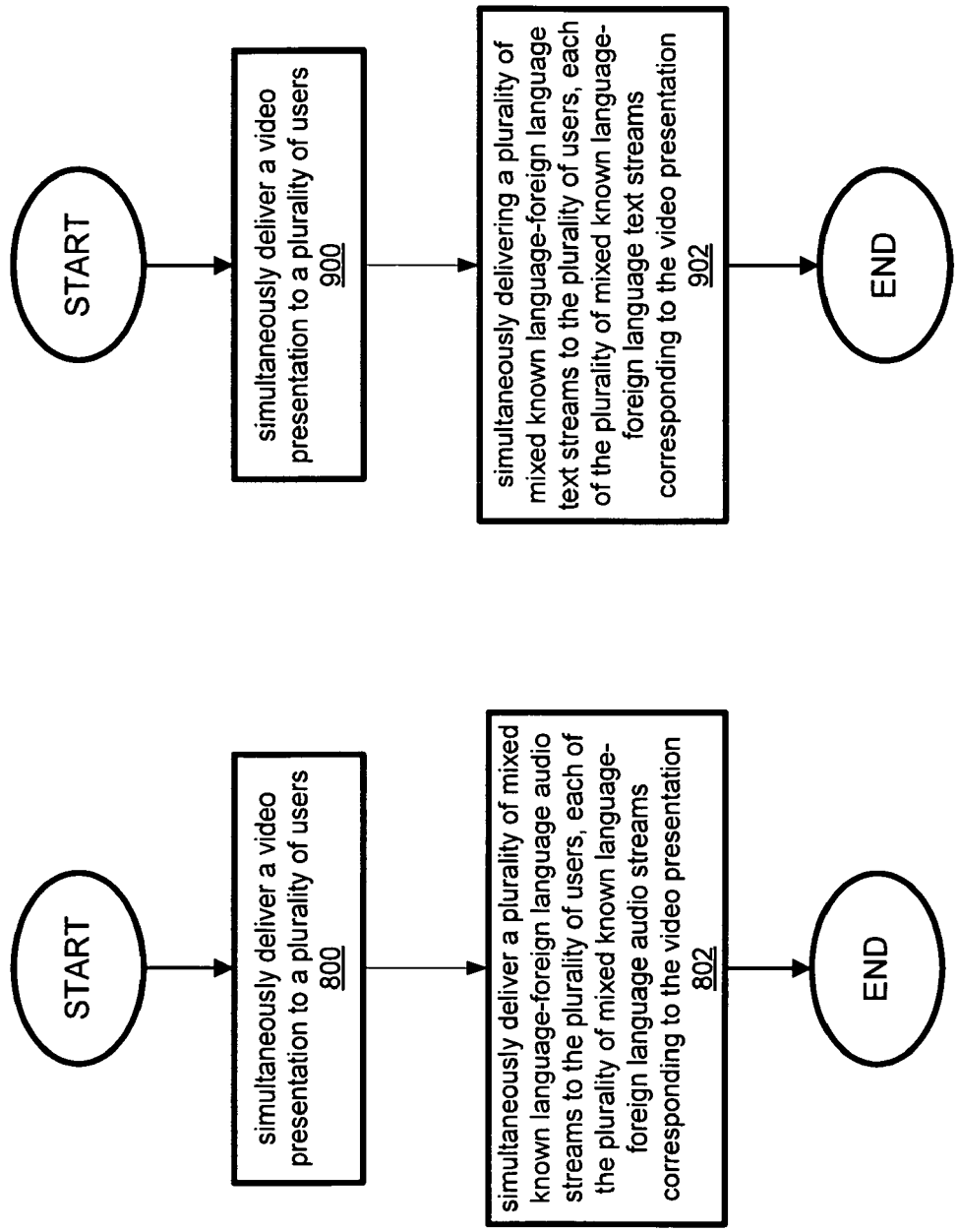

▷▷ NEXT LANGUAGE | INTERACTIVE LANGUAGE COURSES
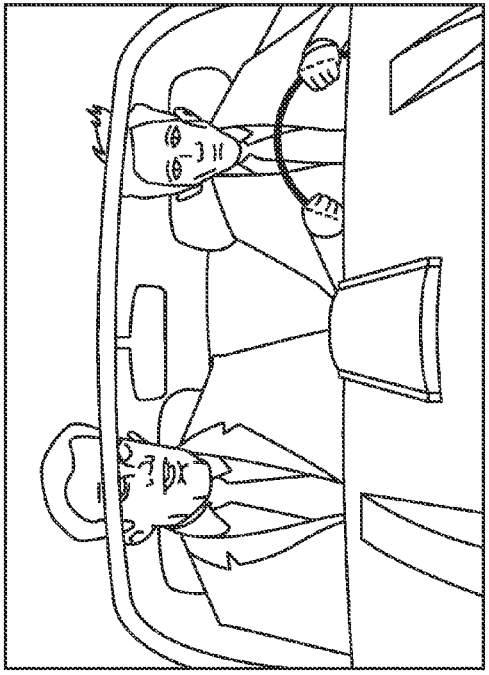
Low proficiency level 
BOLSA: Alright, so out with it.
SANCHO: Out with what?
BOLSA: The secret.
SANCHO: What secret?
BOLSA: The secret of where to find William. You said that Mrs. Morningstar told us where to find William. So, where is William?
SANCHO: William is at home.
FIG.18A ▷▷ NEXT LANGUAGE   INTERACTIVE LANGUAGE COURSES
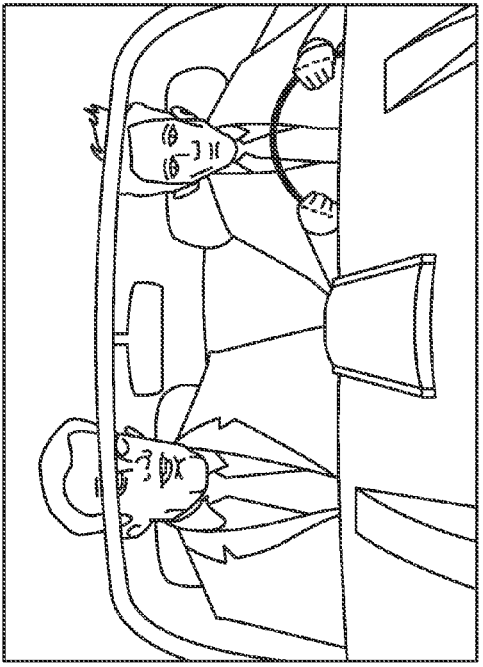
BOLSA: Alright, so out with it.
SANCHO: Out with what?
BOLSA: The secreto.
SANCHO: What secreto?
BOLSA: The secreto of where to find William. You said that Senora Morningstar told us where to find William. So, where is William?
SANCHO: William is at home.
Low-Medium proficiency level
FIG. 18B ▷▷ | NEXT LANGUAGE | INTERACTIVE LANGUAGE COURSES
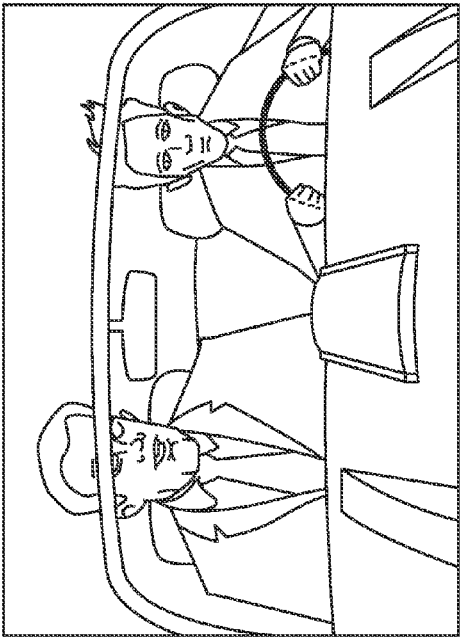
BOLSA: Alright, so out with it.
SANCHO: Out with que?
BOLSA: El secreto.
SANCHO: Que secreto?
BOLSA: The secreto of where to find William. You said that Senora Morningstar told us where to find William. So, donde esta William?
SANCHO: William esta en casa.
Medium-Low proficiency level 
FIG. 18C ▷▷ NEXT LANGUAGE  INTERACTIVE LANGUAGE COURSES
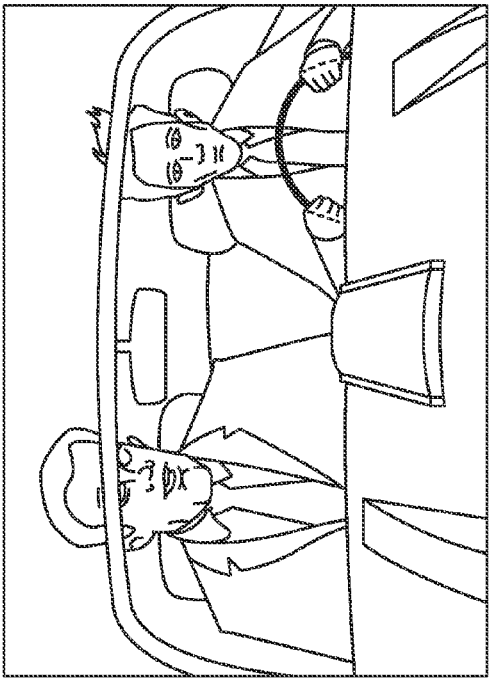
BOLSA: Bueno, entonces out with it.
SANCHO: ¿Suelto qué?
BOLSA: El secreto.
SANCHO: ¿Qué secreto?
BOLSA: El secreto of where to find William. Tú said que la señora Morningstar told us dónde encontrar a William. Entonces, ¿dónde está William?
SANCHO: William está en casa.
Medium proficiency level
 *Flip*
FIG.18D

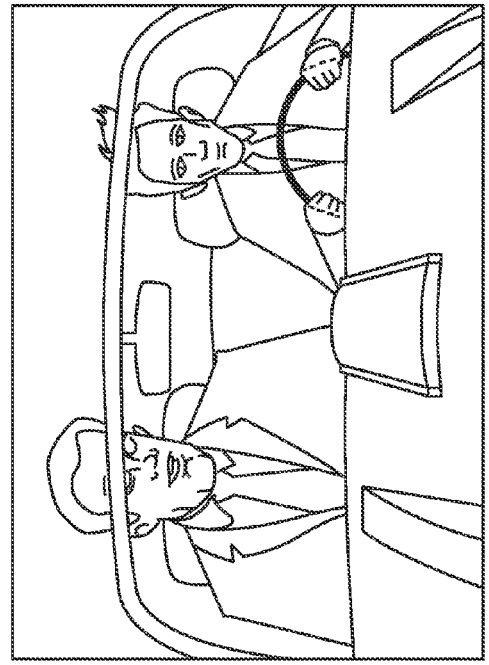
BOLSA: Bueno, entonces out with it.
SANCHO: ¿Suelto qué?
BOLSA: El secreto.
SANCHO: ¿Qué secreto?
BOLSA: El secreto of where to find William. Tú dijiste que la señora Morningstar told us dónde encontrar a William. Entonces, ¿dónde está William?
SANCHO: William está en casa.
Medium-High proficiency level 
FIG.18E

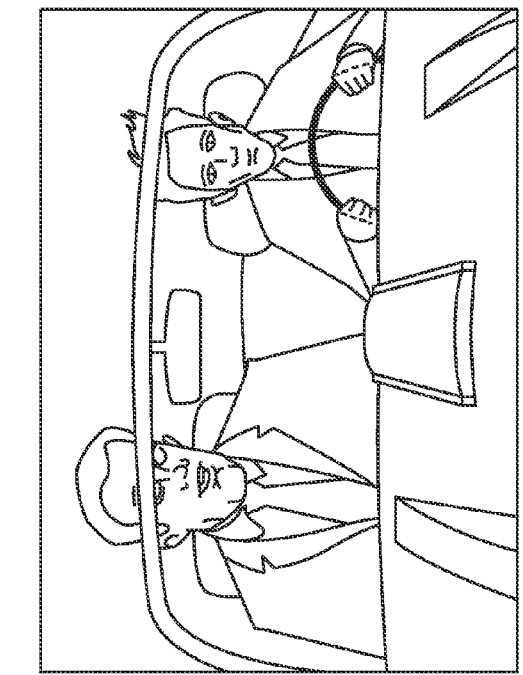
▷▷ NEXT LANGUAGE    INTERACTIVE LANGUAGE COURSES
BOLSA: Bueno, entonces suéltalo.
SANCHO: ¿Suelto qué?
BOLSA: El secreto.
SANCHO: ¿Qué secreto?
BOLSA: El secreto of where to find William. Tú dijiste que la señora Morningstar nos dijo dónde encontrar a William. Entonces, ¿dónde está William?
SANCHO: William está en casa.
High-Medium proficiency level
FIG. 18F ▶▶ NEXT LANGUAGE | INTERACTIVE LANGUAGE COURSES
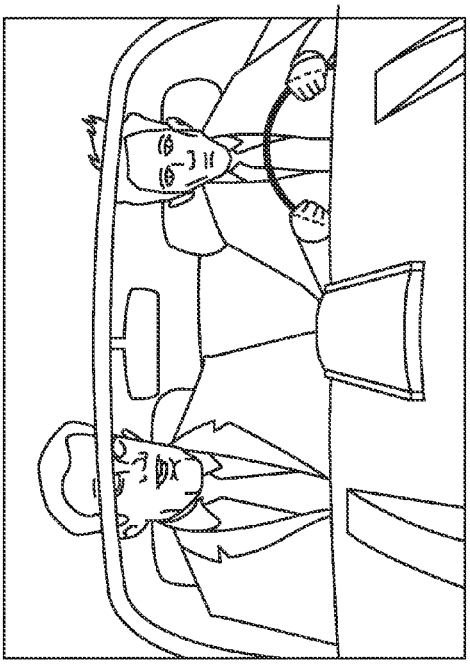
BOLSA: Bueno, entonces sueltalo.
SANCHO: ¿Suelto qué?
BOLSA: El secreto.
SANCHO: ¿Qué secreto?
BOLSA: El secreto de dónde encontrar a William. Tú dijiste que la señora Morningstar nos dijo dónde encontrar a William. Entonces, ¿dónde está William?
SANCHO: William está en casa.
High proficiency level 
FIG. 18G

GROUP FOREIGN LANGUAGE TEACHING SYSTEM AND METHOD

RELATED APPLICATIONS

This application is generally related to U.S. application Ser. No. 11/508,032, titled "Method and System for Teaching a Foreign Language," filed Aug. 21, 2006. The entire disclosure of said application is incorporated herein by reference thereto.

BACKGROUND

Mastering a foreign language is a valuable tool that may be beneficial to one throughout one's life. However, current foreign language learning tools have several drawbacks that impede their utility. One of the main hindrances to learning a foreign language is lack of time. Busy people often do not have the ability to set aside time on a regular basis to learn a new language. Existing foreign language learning tools utilize simple stories or mechanisms to teach the new language. However, they do not utilize activities which the user would already be engaged in to teach the new language, such as going to see a movie, thus maximizing use of the user's time.

In U.S. application Ser. No. 11/508,032, filed Aug. 21, 2006, which is incorporated herein by reference, a method and device for teaching a foreign language is described. A fraction of the words in a text written in a known base language are replaced with synonymous words or phrases in a target foreign language that is being taught. The fraction of words that are replaced can be modified by the user, or can be automatically adjusted in response to measurement of the user's proficiency.

In addition, current foreign language learning tools are designed to teach users who are on the same proficiency level, or to teach users on an individual basis. However, they are not able to simultaneously teach a multiple of users who have varying levels of proficiency.

Some existing systems present full translations to multiple users simultaneously. The New York Metropolitan Opera has individual screens on the seatbacks of each seat which contain subtitles (or "Met supertitles") that translate the opera being sung, thereby allowing the listeners to understand the plot. Anthony Tommasini, *Reinventing Supertitles: How the Met Did It*, N.Y. TIMES, Oct. 2, 1995, at C11. However, the supertitles are not designed to teach users a foreign language. The supertitles present translations of the opera to the users. However, the translations are not presented as diglot weaves and are not configured to help the users to learn the foreign language being used in the opera.

BRIEF DESCRIPTION OF THE DRAWINGS

FIGS. 8-10 are flowcharts illustrating example procedures, according to example embodiments of the present invention;

FIGS. 18A-G illustrate the operation of another example application according to an example embodiment of the present invention.

DETAILED DESCRIPTION OF EXAMPLE EMBODIMENTS

Figure 1:
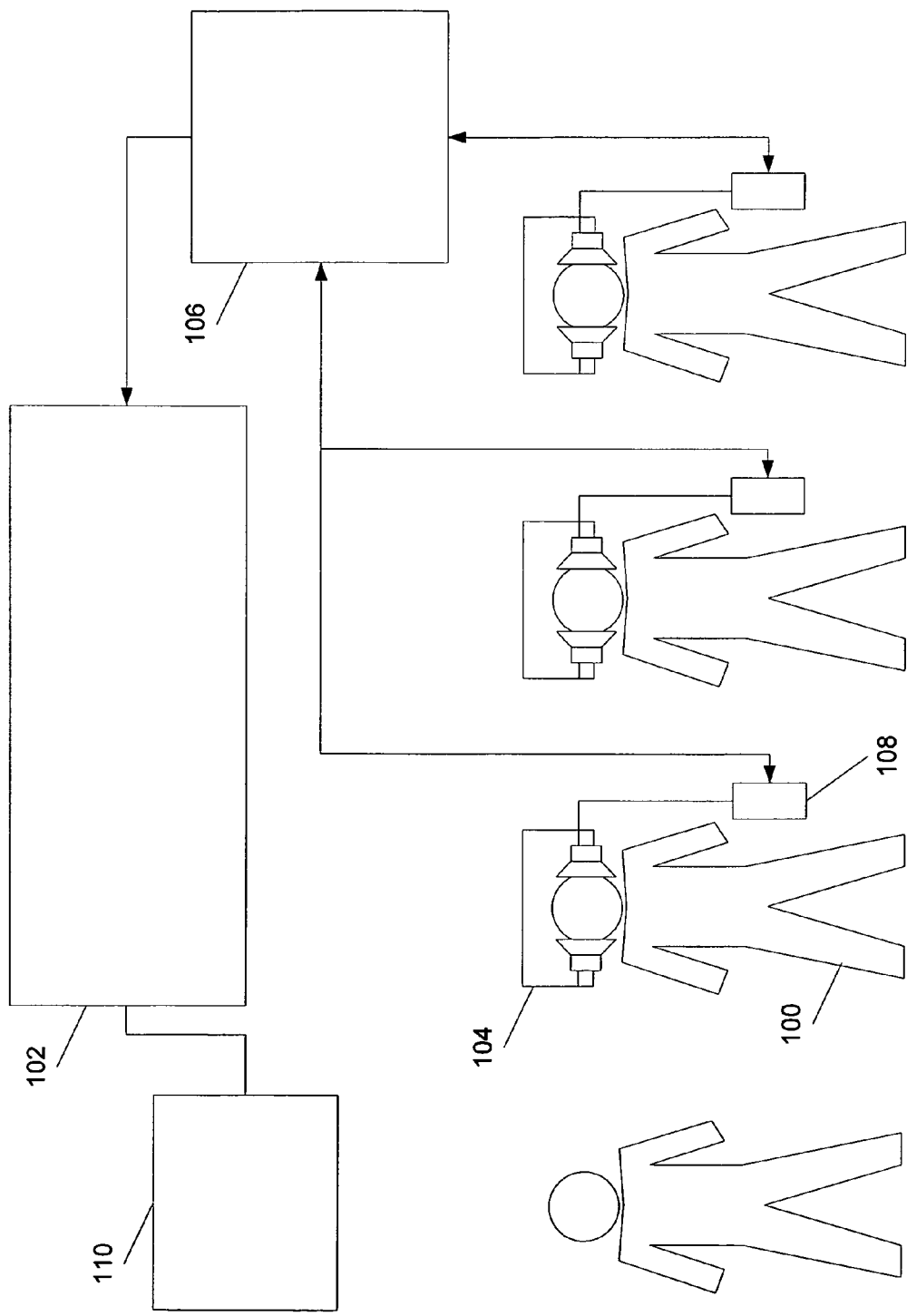
FIG. 1 is a simplified block diagram of an example foreign language learning tool, according to an example embodiment of the present invention.

Some embodiments of the present invention may work cooperatively with existing audiovisual presentations to teach a target foreign language to a user with knowledge of a base language. The methods and tools present users with content where the target foreign language and base user language are intermixed or "woven," e.g., by replacing a subset of the words and phrases in a text in the base language with words and phrases in the target foreign language, or vice versa. In some example embodiments of the present invention, while watching a visual presentation, the user may be presented with content, including audio, text, or a combination, which is in the form of a weave, where various words and phrases are presented in a mixed format, some in the user's known base language and some in the user's target foreign language. In some example embodiments of the present invention, multiple users may view the same visual presentation simultaneously, and each user may be presented with a written text and/or audio stream that is associated with the visual presentation. The text and/or audio stream may be presented to each user in an individualized weave corresponding to each user's level of indicated proficiency. In some example embodiments, each user may be able to request a different level of difficulty for the weave, e.g. by adjusting a control. Alternatively, levels may be adjusted by the system, e.g. automatically based on automated assessment of user proficiency.

In some example embodiments of the present invention, multiple users may simultaneously view a visual presentation, such as a movie, while each listening to a customized audio weave based on each individual user's indicated difficulty level. This may be, for example, in a movie theatre. The customized audio weave may be presented to the users in various languages. Each user may have his own personalized audio device, e.g. headset or earpiece, which presents him with a customized audio weave. Each user may also have a device whereby he is able to indicate his desired level of difficulty, which in turn affects the amount of target foreign language in the audio weave. This device may be, for example, a remote control.

In some example embodiments of the present invention, multiple users may simultaneously view a visual presentation, such as a movie, while each being presented with a customized text weave based on each user's indicated difficulty level. The users may be seated in rows of chairs, with personal screens on the back of each chair. This may be, for example, in a theatre setting or on an airplane. Each user may have a device whereby he is able to indicate his desired level of difficulty. Each user's personal screen may be customized with a subtitle text weave according to the user's requested level of difficulty. While the user views the movie, a subtitle text weave at the requested level of difficulty may be presented on the screen. Additionally, the users may simultaneously be presented with the audio corresponding to the visual presentation. The audio may be in the language in which the visual presentation was initially created, or in any other language. It may also be presented in a weave using the approach previously described.

In some example embodiments of the present invention, one or more users may view individual visual presentations, such as television broadcasts or digital television programs, while being presented with a customized text weave based on each user's indicated difficulty level. The users may be seated in rows of chairs, with screens on the back of each chair. This may be, for example, in a theatre setting or on an airplane. Each user may have a device whereby he is able to indicate his desired level of difficulty. Each user's personal screen may be customized with a subtitle text weave according to the user's requested level of difficulty. While the user views the visual presentation, a subtitle text weave in the requested level of difficulty may be presented on the personal screen. Additionally, the users may be simultaneously presented with the audio corresponding to the selected visual presentation. The audio may be in the language in which the visual presentation was initially created, or in any other language. It may also be presented in a weave using the approach previously described.

In some example embodiments of the present invention, multiple users may view a visual presentation, such as a movie, simultaneously while viewing a customized text weave based on each user's indicated difficulty level. The users may view the customized text weave via an individual visual output device, e.g. special glasses. Each user may have his own individual visual output device which presents him with a customized text weave. Each user may also have a device whereby he is able to indicate his desired level of difficulty. This device may be, for example, a remote control. Additionally, the users may be simultaneously presented with the audio corresponding to the selected visual presentation. The audio may be in the language in which the visual presentation was initially created, or in any other language. It may also be presented in a weave using the approach previously described.

In some example embodiments of the present invention, multiple users may view a visual presentation, such as a movie, simultaneously while viewing a customized text weave based on each user's indicated difficulty level and while each listening to a customized audio weave based on the individual user's indicated difficulty level. The users may view the customized text weave via an individual visual output device, e.g. special glasses, that they are wearing. Each user may have his own individual visual output device which presents him with a customized text weave. Each user may also have his own personalized audio device, e.g. headset or earpiece, which presents him with a customized audio weave. Each user may also have a device whereby he is able to indicate his desired level of difficulty. The text weave presented to each user and the audio weave presented to each user may correspond to each other.

FIG. 1 is a simplified block diagram of an example foreign language learning tool, according to an example embodiment of the present invention. Multiple users 100 may view a common visual presentation on a screen 102. This may be, for example, a movie or a television program. Each user 100 may have a personal audio device 104, e.g. a headset or an earpiece, which may receive an audio weave corresponding to the text of the visual presentation from a weave repository 106. Methods for creating and managing weaves are described in U.S. application Ser. No. 11/508,032, which is incorporated herein by reference. The user may also have an input device 108 whereby the user may select a desired difficulty level for the weave to be presented to him. For example, the user may select "easy" and the weave presented to him may consist of most words in the user's base language and only a few words in the target foreign language. The input device 108 may be, for example, a keypad with several different buttons that the user may select. For example, the keypad may contain the following buttons: easy, medium, hard. Via the input device 108, the user 100 may also be able to select the desired target foreign language. For example, the user may be presented with the following selections for a foreign language: Spanish, French, Italian. Then, the user 100 may choose, for example, Spanish. The audio text weave presented to the user 100 may contain words from the user's base language, such as English, and from the target foreign language, such as Spanish. Each user 100 may have their own personal audio device 104, e.g. a headset or an earpiece, and input device 108. Each user 100 may then be presented with an audio weave in the difficulty level that they choose. A user 100 may also listen to the audio being projected by the main speaker 110 without the use of a personal audio device 104. This audio may correspond to the visual presentation and may be totally in the users' 100 base language, totally in the target foreign language, or in any other language.

Figure 2:
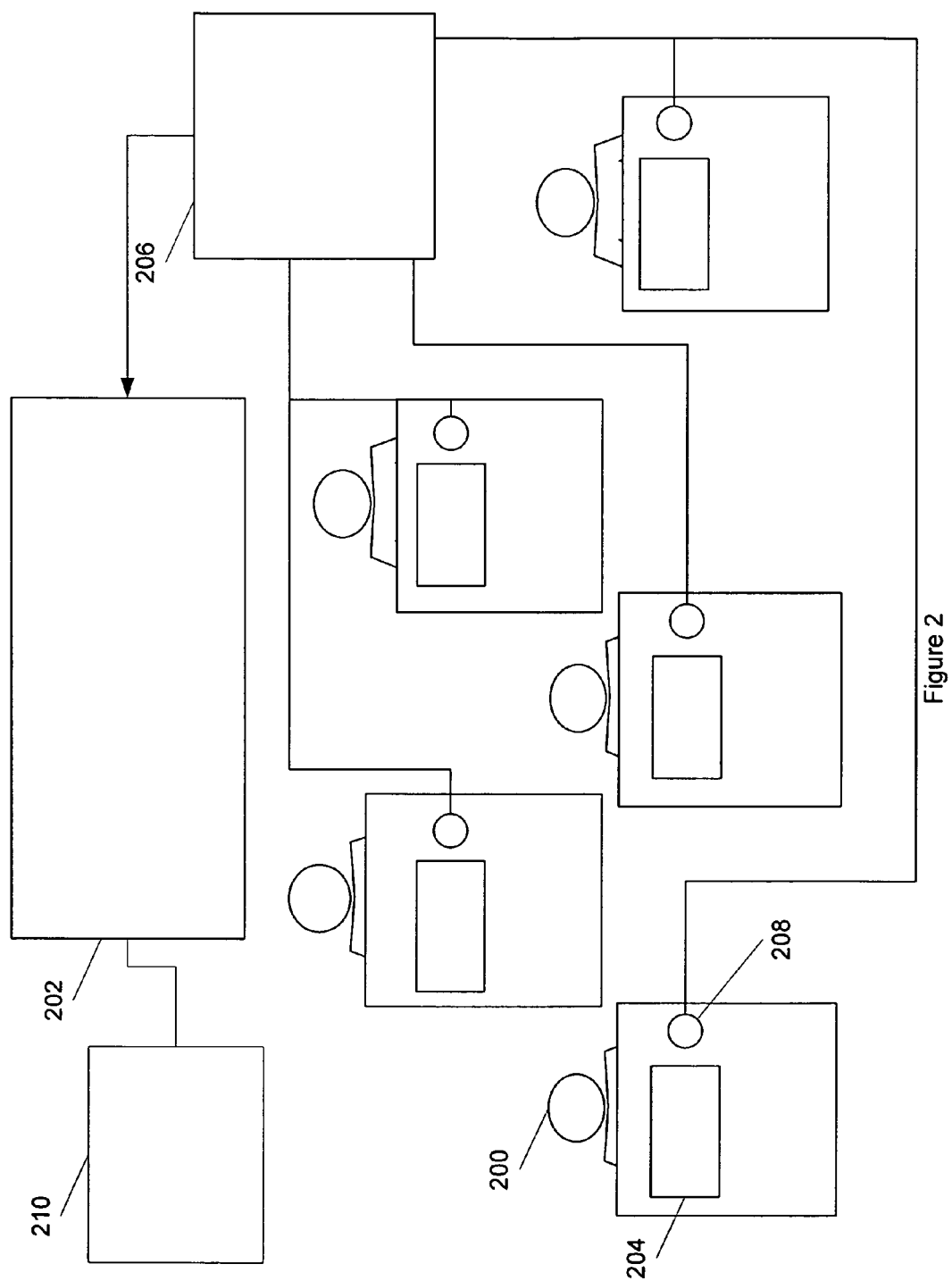
FIG. 2 is a simplified block diagram of another example foreign language learning tool, according to an example embodiment of the present invention.

FIG. 2 is a simplified block diagram of an example foreign language learning tool, according to an example embodiment of the present invention. A user 200 may view a visual presentation on a screen 202. This may be, for example, a movie or a television program. A user 200 may receive a text weave on a personal output device 204, e.g. a personal screen, corresponding to the text of the visual presentation. This personal screen may be, for example, on the back of the chair in front of the user. The weave may be obtained from a weave repository 206. The user may also have an input device 208 whereby the user may select a desired difficulty level for the text weave to be presented to him. For example, the user may select "easy" and the weave presented to him may consist of most words in the user's base language and only a few words in the target foreign language. The input device 208 may be, for example, a keypad with several different buttons that the user may select. For example, the keypad may contain the following buttons: easy, medium, hard. Via the input device 208, the user 200 may also be able to select the desired target foreign language. For example, the user may be presented with the foreign language choices Korean and Chinese. Then, the user 200 may choose, for example, Korean. The text weave presented to the user 200 may contain words from the user's base language, such as English, and from the target foreign language, such as Korean. Each user 200 may have their own personal screen 204 and input device 208. Each user 200 may then be presented with an text weave on their personal screen 204 in the difficulty level that they choose. This text weave may correspond to the visual presentation being displayed on the screen 202. The users may listen to audio being projected by a main speaker 210. This audio may correspond to the visual presentation and may be totally in the users' 200 base language, totally in the target foreign language, or in any other language.

Figure 3:
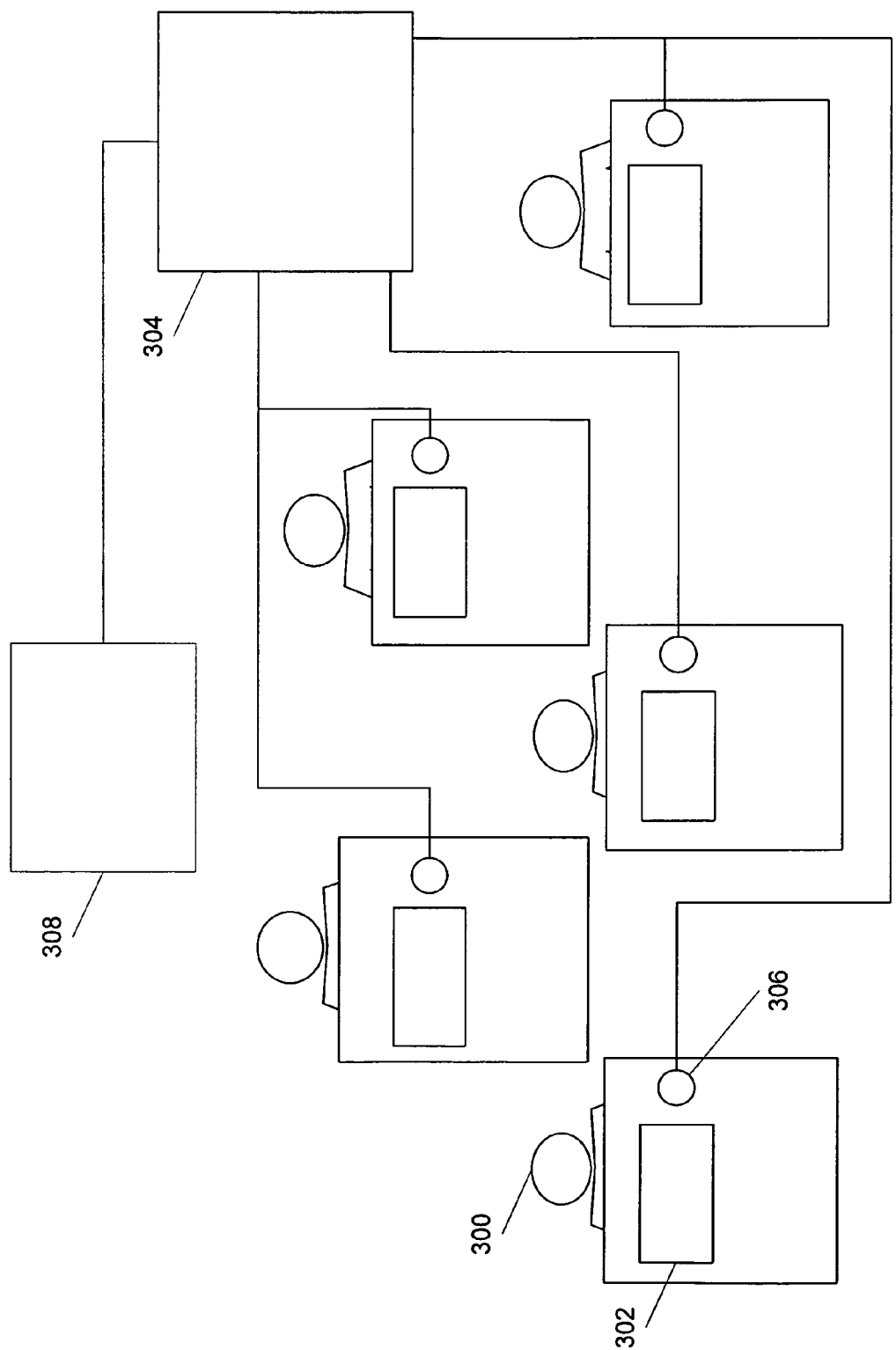
FIG. 3 is a simplified block diagram of another example foreign language learning tool, according to an example embodiment of the present invention.

FIG. 3 is a simplified block diagram of an example foreign language learning tool, according to an example embodiment of the present invention. A user 300 may view a visual presentation, such as a movie or television program, on the personal screen 302 in front of him. This personal screen 302 may be, for example, on the back of the chair in front of the user 300. A user 300 may also receive a text weave on the personal screen 302 corresponding to the text of the visual presentation. The text may be provided using the same general system used to deliver Met supertitles, but instead of different languages, different weaves may be provided in one or more target languages. The text weave may appear, for example, as a subtitle on the personal screen. The weave may be obtained from a weave repository 304. The user may also have an input device 306 whereby the user may select a desired difficulty level for the text weave to be presented to him. For example, the user may select "hard" and the weave presented to him may consist of most words in the user's target foreign language and only a few words in the user's base language. The input device 306 may be, for example, a keypad with several different buttons that the user may select. For example, the keypad may contain the following buttons: easy, medium, hard. Via the input device 306, the user 300 may also be able to select the desired target foreign language. For example, The input device 306 may also contain buttons corresponding to different foreign languages, such as Korean and Chinese. Then, the user 300 may select, for example, Korean. The text weave presented to the user 300 may contain words from the user's base language, such as English, and from the target foreign language, such as Korean. The input device 306 may also allow the user to choose a visual presentation which he wishes to view. For example, via the input device 306, the user 300 may be able to choose amongst several pre-recorded television programs. Alternatively, the input device 306 may allow the user to choose from amongst several stations on cable television. Each user 300 may have their own personal screen 302 and input device 306. Each user 300 may then be presented with a visual presentation and a text weave on their personal screen 302 in the difficulty level that they choose. This text weave may correspond to the visual presentation being displayed on the personal screen 302. The users 300 may listen to audio being projected by a main speaker 308. Alternatively, the users may listen to the audio via headphones. This audio may correspond to the visual presentation and may be totally in the users' 300 base language, totally in the target foreign language, or in any other language.

Figure 4:
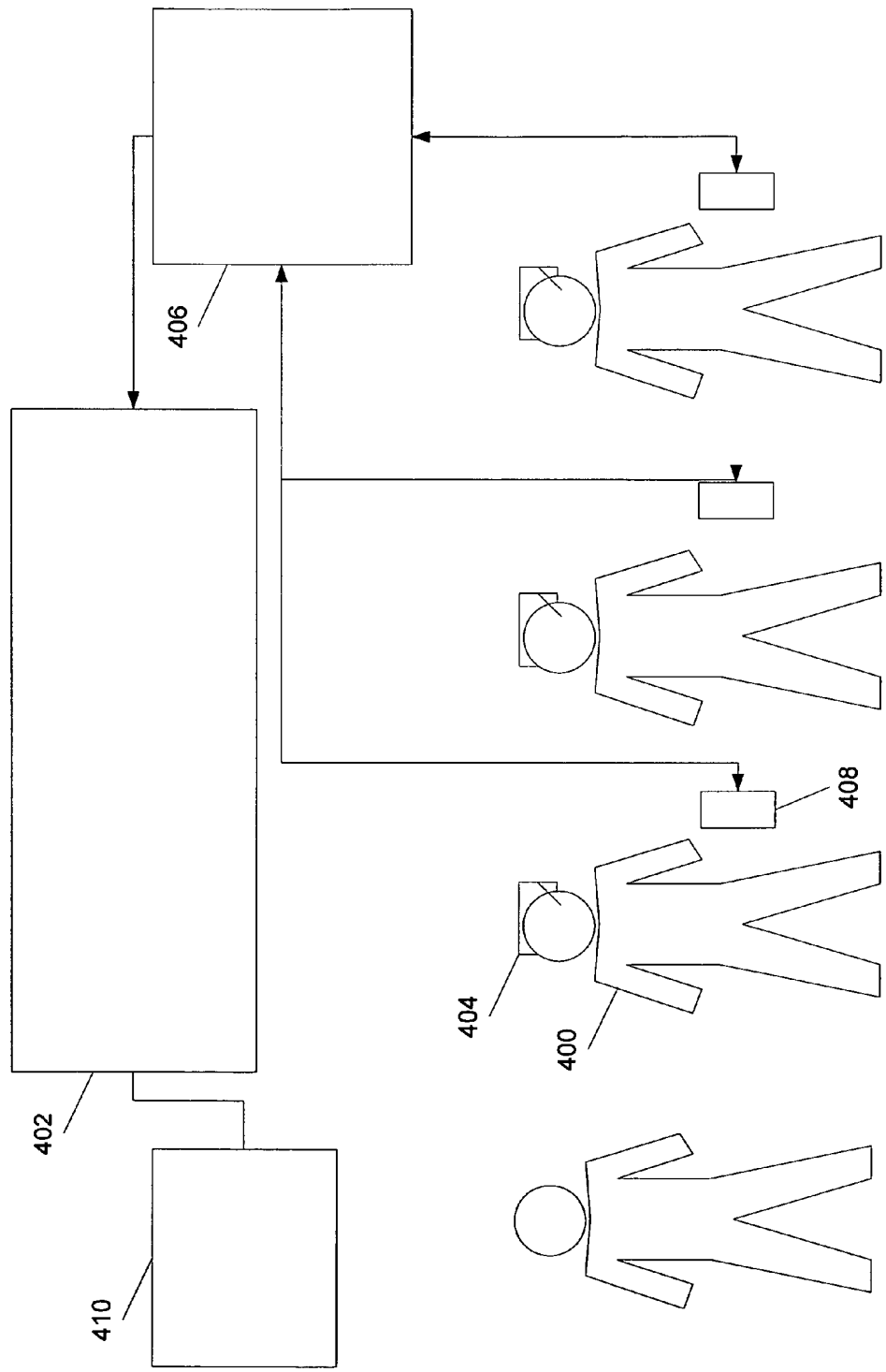
FIG. 4 is a simplified block diagram of another example foreign language learning tool, according to an example embodiment of the present invention.

FIG. 4 is a simplified block diagram of an example foreign language learning tool, according to an example embodiment of the present invention. A user 400 may view a visual presentation on a screen 402. This may be, for example, a movie or a television program. A user 400 may have a personal video output device 404, e.g. special glasses, which may receive a text weave corresponding to the text of the visual presentation from a weave repository 406. The user may also have an input device 408 whereby the user may select a desired difficulty level for the weave to be presented to him. For example, the user may select "medium" and the weave presented to him may consist of some words in the user's base language and some words in the target foreign language. The input device 408 may be, for example, a keypad with several different buttons that the user may select. For example, the keypad may contain the following buttons: easy, medium, hard. Via the input device 408, the user 400 may also be able to select the desired target foreign language. For example, the user may be presented with French and Japanese as selections for a foreign language. Then, the user 400 may choose, for example, Japanese. The text weave presented to the user 400 may contain words from the user's base language, such as English, and from the target foreign language, such as Japanese. Each user 400 may have their own personal video output device 404 that allows the user to see both the shared video and the text, e.g. special glasses, and input device 408. Each user 400 may then be presented with a text weave in the difficulty level that they choose. A user 400 may not wear the personal video output device 404 and may view the visual presentation on the screen 402 without the subtitled text weave. The users 400 may listen to audio being projected by a main speaker 410. This audio may correspond to the visual presentation and may be totally in the users' 400 base language, totally in the target foreign language, or in any other language.

Figure 5:
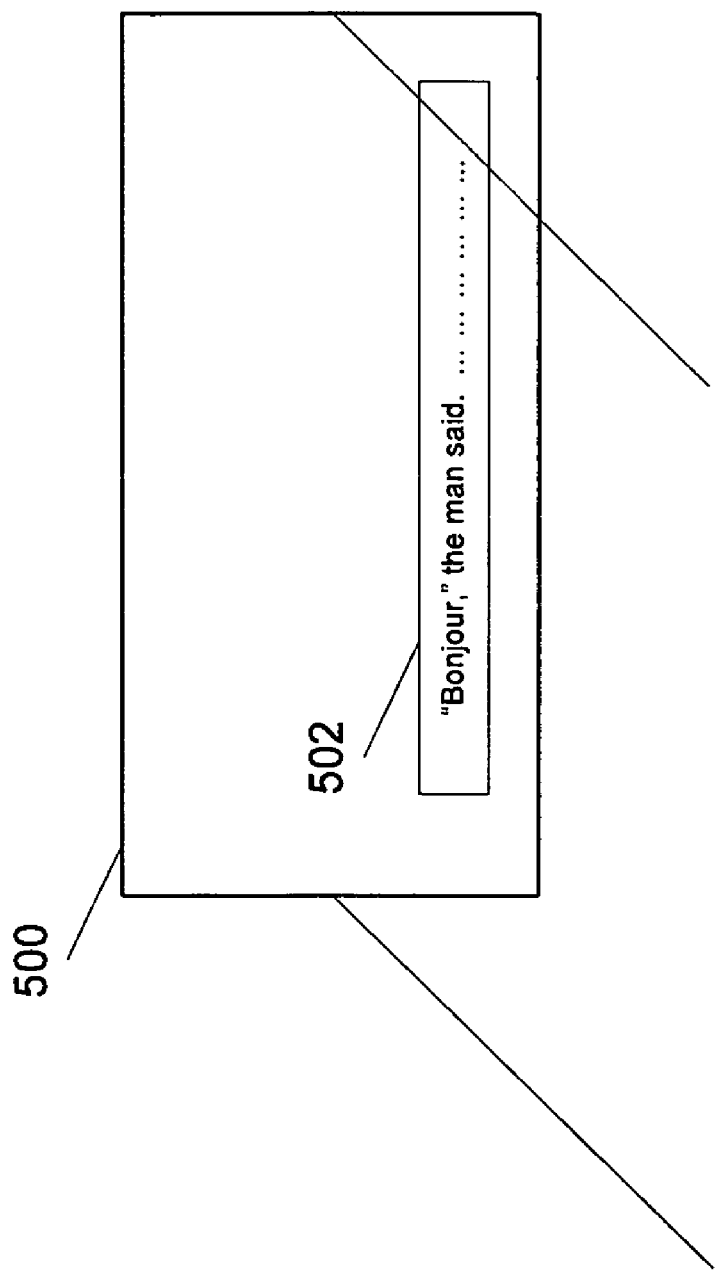
FIG. 5 is an example graphical representation of one pair of special glasses, as referenced in FIG. 4.

FIG. 5 is an example graphical representation of one pair of special glasses, as referenced in FIG. 4. The special glasses 500 may operate wirelessly. Alternatively, the special glasses 500 may be connected to the weave text repository via a wire. The special glasses 500 may receive a text weave 502 corresponding to the visual presentation on a screen. Special glasses containing subtitles have been described in numerous patents, for example, U.S. Pat. No. 5,648,789.

Figure 6:
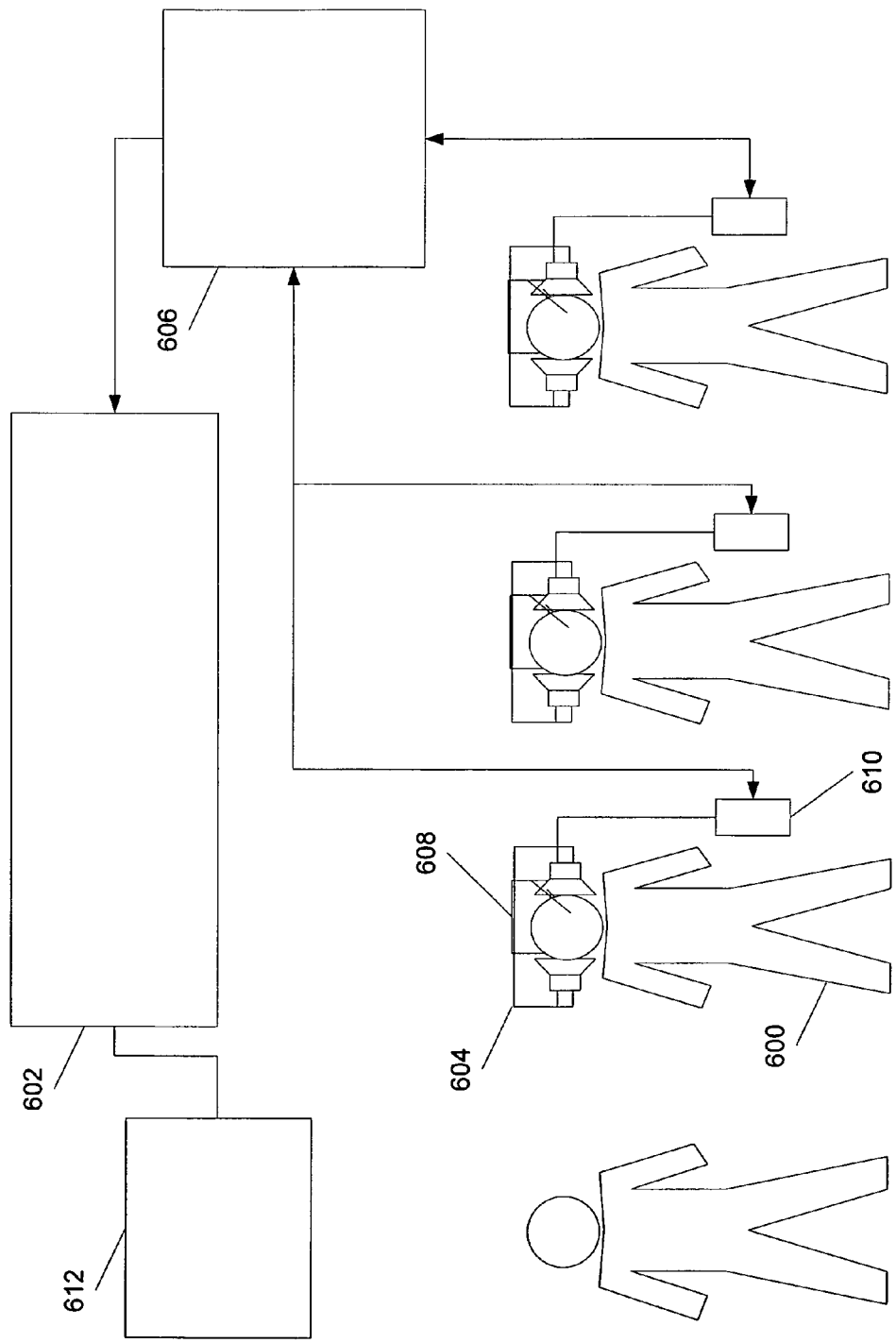
FIG. 6 is a simplified block diagram of another example foreign language learning tool, according to an example embodiment of the present invention.

FIG. 6 is a simplified block diagram of an example foreign language learning tool, according to an example embodiment of the present invention. Multiple users 600 may view a common visual presentation on a screen 602. This may be, for example, a movie or a television program. Each user 600 may have a personal audio device 604, e.g. a headset or an earpiece, which may receive an audio weave corresponding to the text of the visual presentation from a weave repository 606. Additionally, each user may have a personal video output device 608, e.g. special glasses, which may receive a text weave corresponding to the text of the visual presentation from a weave repository 606. The user may also have an input device 610 whereby the user may select a desired difficulty level for the weave to be presented to him. For example, the user may select "hard" and the weave presented to him may consist of most words in the user's target foreign language and only a few words in the user's base language. The input device 610 may be, for example, a keypad with several different buttons that the user may select. For example, the keypad may contain the following buttons: easy, medium, hard. Via the input device 610, the user 600 may also be able to select the desired target foreign language. For example, the user may be presented with the following selections for a foreign language: German, Finnish, Hebrew. Then, the user 600 may choose, for example, Finnish. The audio weave and visual weaves presented to the user 600 via the personal audio device 604 and personal video output device 608, respectively, may contain words from the user's base language, such as English, and from the target foreign language, such as Finnish. Each user 600 may have their own personal audio device 604, personal video output device 608 and input device 610. Each user 600 may then be presented with an audio weave and text weave in the difficulty level that they choose. A user 600 may also listen to the audio being projected by the main speaker 612 without the use of a personal audio device 604. This audio may correspond to the visual presentation and may be totally in the users' 600 base language. A user 600 may also view the visual presentation without the personal video output device 608 containing the text weave subtitles.

Figure 7:
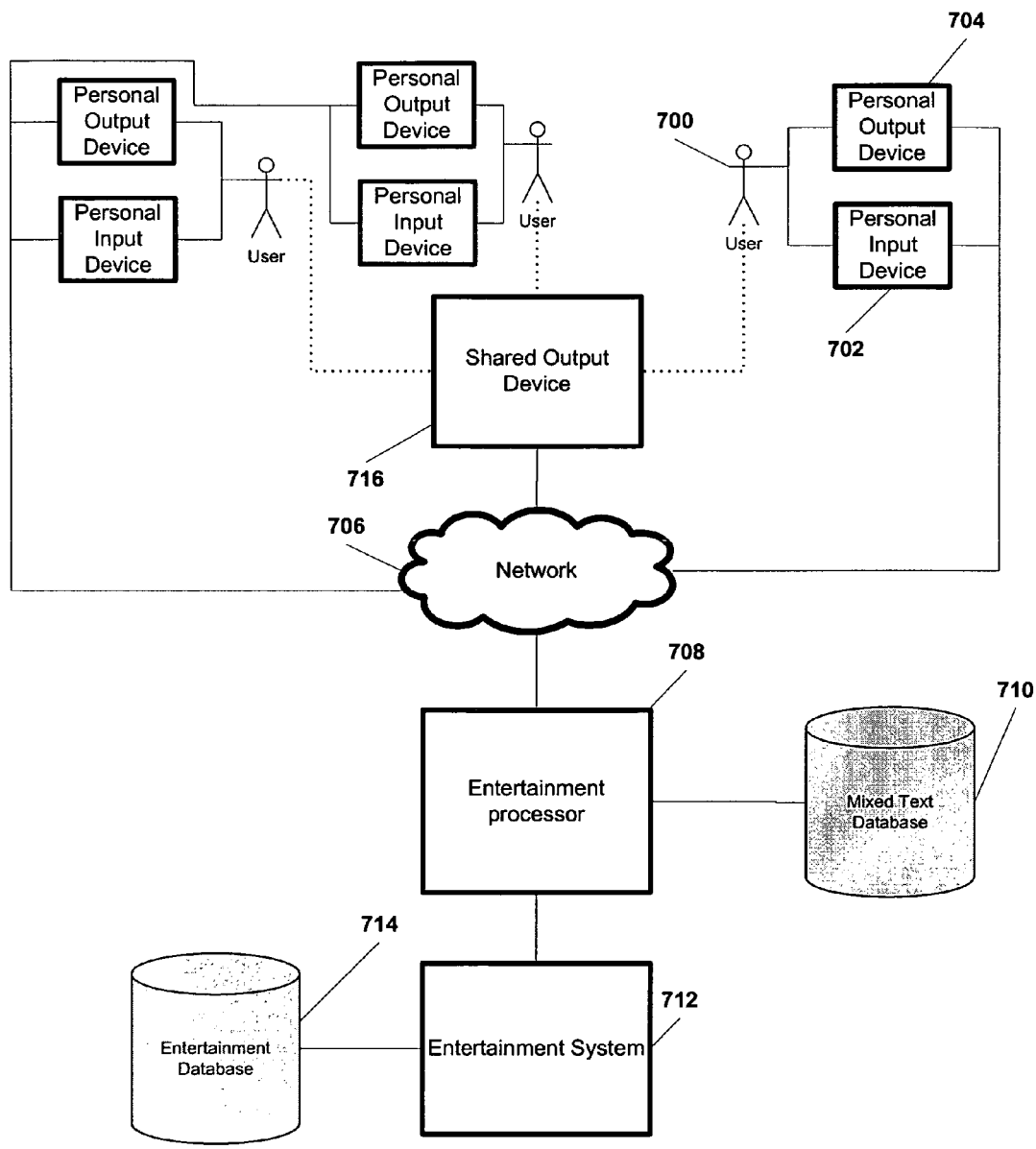
FIG. 7 illustrates an example foreign language learning tool operable in conjunction with visual presentations, according to an example embodiment of the present invention.

FIG. 7 illustrates an example foreign language learning tool operable in conjunction with visual presentations, according to an example embodiment of the present invention. A user 700 may access the target foreign language learning tool through a personal input device 702, such as a keypad or remote control. The personal input device 702 may access the entertainment processor 708 via a network 706. The user may indicate his desired difficulty level via the personal input device 702. Once the user 700 has indicated his desired difficulty level, the entertainment processor 708 may access the appropriate weave for the user in the mixed test database 710. The entertainment processor 708 may also access the visual presentation to display to the user via the entertainment system 712. The user may be able to indicate his desired visual presentation via the personal input device 702. The entertainment system 712 may then access the visual presentation indicated by the user in the entertainment database 714. The user 700 may then be presented with a visual presentation and a corresponding text and/or audio weave, according to the indication of the user 700. The user may be presented with the visual presentation and the corresponding audio by the shared output device 716. Alternatively, the user may be presented with the visual presentation by the personal output device 704. The user may also be presented with the text and/or audio weave via the personal output device 704.

The weave that is provided to the user may be presented as an audio stream. The audio stream may contain a special intonation or pitch for the target foreign language words. For example, if the sentence being read to the user is: "The dog ran to the arbol," then there may be a special pitch or intonation used for the word "arbol." This change in pitch or intonation may serve to alert the user that the word being presented is a target foreign language word.

FIG. 8 is a flowchart illustrating an example procedure, according to example embodiments of the present invention. In 800, a video presentation may be delivered to a plurality of users. In 802, a plurality of mixed known language-foreign language audio streams may be delivered to the plurality of users, where each of the plurality of mixed known language-foreign language audio streams correspond to the video presentation.

FIG. 9 is a flowchart illustrating an example procedure, according to example embodiments of the present invention. In 900, a video presentation may be delivered to a plurality of users. In 902, a plurality of mixed known language-foreign language text streams may be delivered to the plurality of users, where each of the plurality of mixed known language-foreign language text streams correspond to the video presentation.

Figure 10:
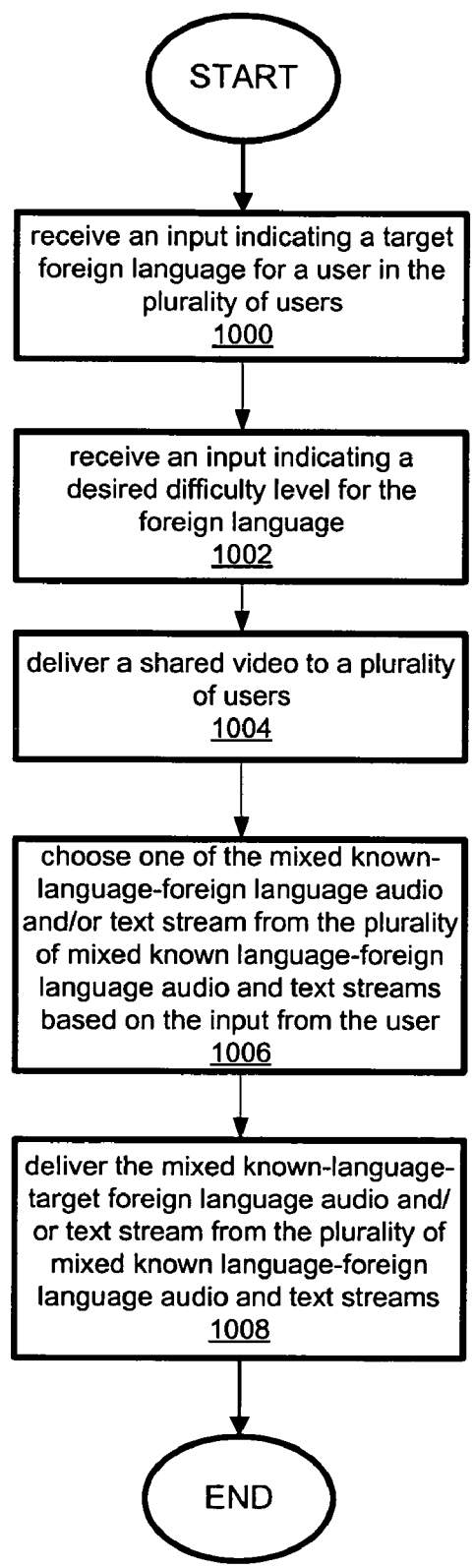

FIG. 10 is a flowchart illustrating an example procedure, according to example embodiments of the present invention. In 1000, input indicating a target foreign language for a user in a plurality of users is received. For example, the input may indicate that the user desires the target foreign language to be French. In 1002, input indicating a desired difficulty level is received. For example, the input may indicate that the user desires the target foreign language difficulty level to be "easy." In that example, most words presented to the user would be in the user's base language, and only a small portion of the words presented to the user would be in the target foreign language. In 1004, a shared video is delivered to a plurality of users. In 1006, a mixed known language-foreign language audio and/or text stream from the plurality of mixed known language-foreign language audio and text streams may be chosen based on the user input. For example, if the user indicated that he would like a text stream with the target foreign language being Spanish, a text stream with the target foreign language being Spanish may be chosen. For example, if the user indicated that he would like a text stream in the target foreign language with a difficulty level of "easy," a text stream in the target foreign language with a difficulty level of "easy" may be chosen. In 1008, the chosen mixed known language-foreign language audio and/or text stream from the plurality of mixed known language-foreign language audio and text streams may be delivered., For example, if the user indicated that he would like a text stream with the target foreign language being French, a text stream in the target foreign language of French may be delivered to the user. For example, if the user indicated that he would like an audio stream with a difficulty level of "medium," an audio stream with a difficulty level of "medium" may be delivered.

Figure 11:
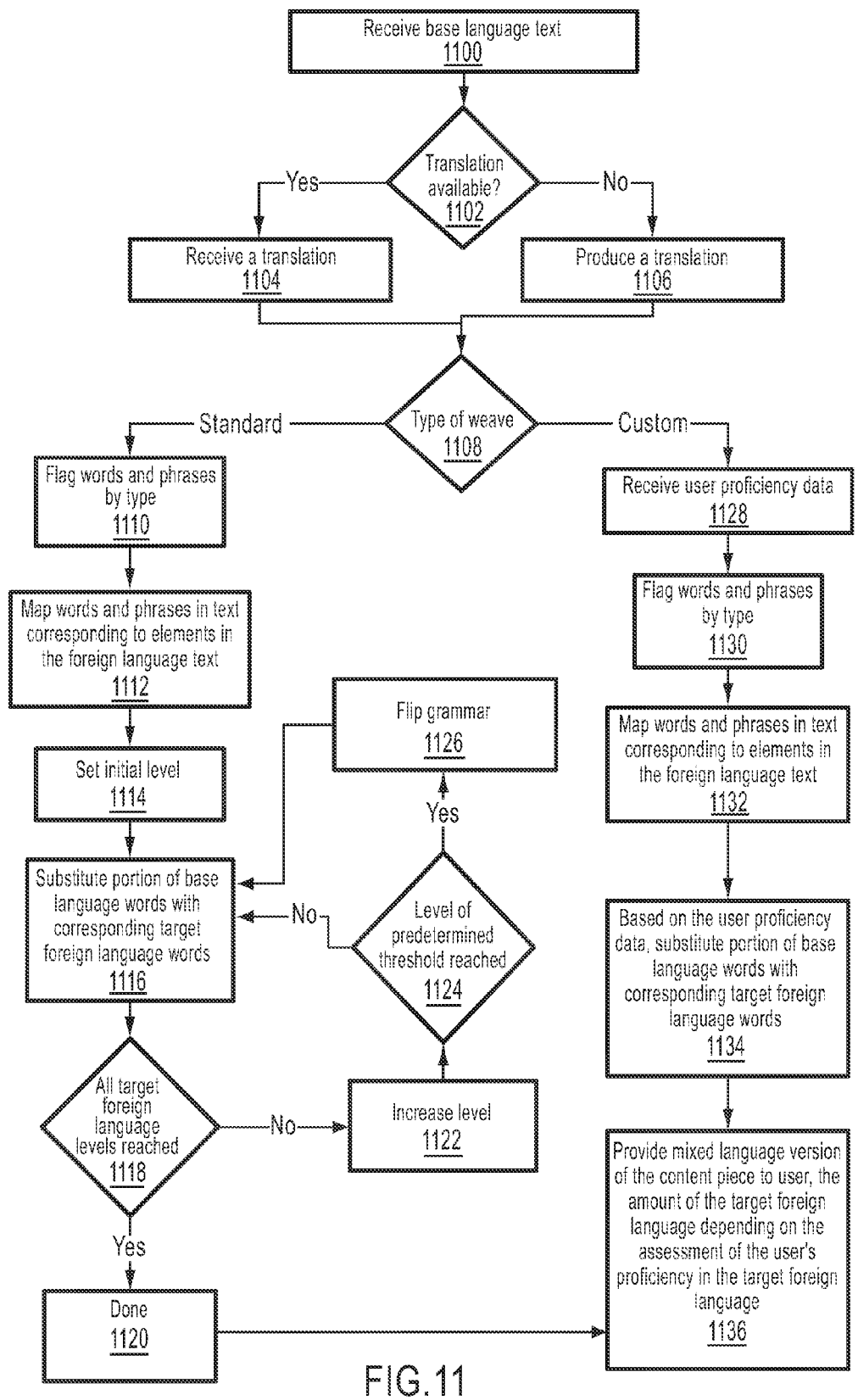
FIG. 11 is a flowchart illustrating an example procedure for creating a text made up of both base language and target foreign language words, according to an example embodiment of the present invention.

FIG. 11 is a flowchart illustrating an example procedure for producing mixed language texts for presentation to a user, according to an example embodiment of the present invention. In 1100, the procedure may begin with the receipt of a text in the user's base language, e.g., by an example foreign language learning tool (FLLT). It will be appreciated that the example procedure may be performed by an FLLT, or may be performed by other systems, such as a pre-processing system in communication with the FLLT, or may alternatively be performed by a human editor. The base language may be, for example, any language with which the user is fluent, such as English. In 1102, the FLLT may determine whether a translation of the text in the target foreign language is available. If the translation is available, in 1104, the FLLT may receive the translation in the target foreign language. If the translation is not available, in 1106, the FLLT may produce a translation of the text into the target foreign language. In 1108, the FLLT may determine whether the type of the weave to be produced is a standard weave or customized weave.

If the type of weave to be produced is standard, a set of weaves may be produced, for example, at low, low-medium, medium, and high levels of proficiency. In 1110, in order to produce the weaves, words and phrases in the text may be flagged according to their types, such as verbs, nouns, etc. In 1112, words and phrases in the base language text corresponding to elements in the target foreign language text may be mapped. In 1114, an initial level may be set at which to produce the weaves, such as low. In 1116, a portion of the base language words may be substituted with corresponding target foreign language words. In 1118, it may be determined whether all the desired target foreign language levels have been produced. For example, it may be determined that the levels to be produced are low, medium, and high. Then, if only low has been produced, not all of the target foreign language levels have been produced. Alternatively, if low, medium and high have been produced, then all the target foreign language levels have been produced. In 1120, if all the target foreign language levels have been produced, then the method is complete. In 1122, if not all the target foreign language levels have been produced, then the level is increased. For example, if the previous level was set at medium, the level may be increased to high. In 1124, it may be determined whether the level of predetermined threshold has been reached. For example, this level may be set at medium. In 1116, if the level of predetermined threshold has not been reached, another standard weave is produced by substituting a portion of the base language with corresponding target foreign language words. In 1126, if the level of predetermined threshold has been reached, then the grammar is flipped. For example, if the base language is English and the grammar was previously in English syntax, the grammar syntax may be flipped to that of the target foreign language, such as Spanish. In 1116, another standard weave is produced by substituting a portion of the base language with corresponding target foreign language words.

If the type of weave to produce is custom, then the weave will be designed according to the strengths and weaknesses of a specific user. In 1128, a user's proficiency data may be received. For example, a user's proficiency level of specific words in the target foreign language may be received. In 1130, words and phrases in the text may be flagged according to their types, such as verbs, nouns, etc. In 1132, words and phrases in the base language text corresponding to elements in the target foreign language text may be mapped. In 1134, based on the user's individual proficiency data, base language words may be substituted with corresponding target foreign language words to create a customized weave. In 1136, a mixed language version of the content piece is provided to the user, the amount of target foreign language in the mixed language version of the content piece depending on the assessment of the user's proficiency in the target foreign language.

Figure 12:
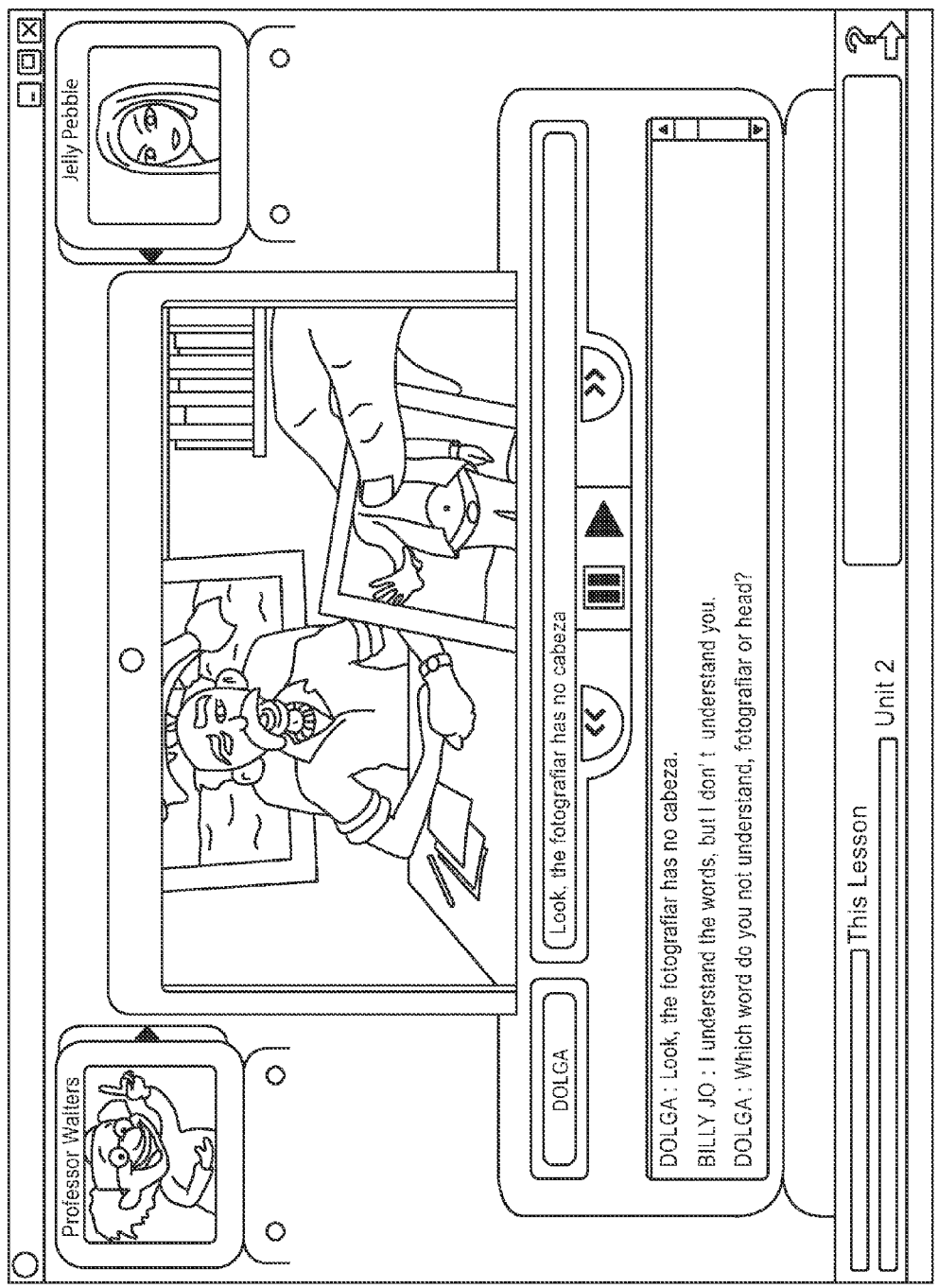
FIG. 12 illustrates the operation of an example application according to an example embodiment of the present invention.

FIG. 12 illustrates the operation of an example application according to an example embodiment of the present invention. In this example, a dialogue is presented to the user in a weave based on his level of proficiency. The text may be read aloud to user while he is presented with it as written text on the screen. Terms in the target foreign language may be highlighted. A video or pictorial image may accompany the written text. Forward and backward controls may be used to control the play of the story.

Figure 13:
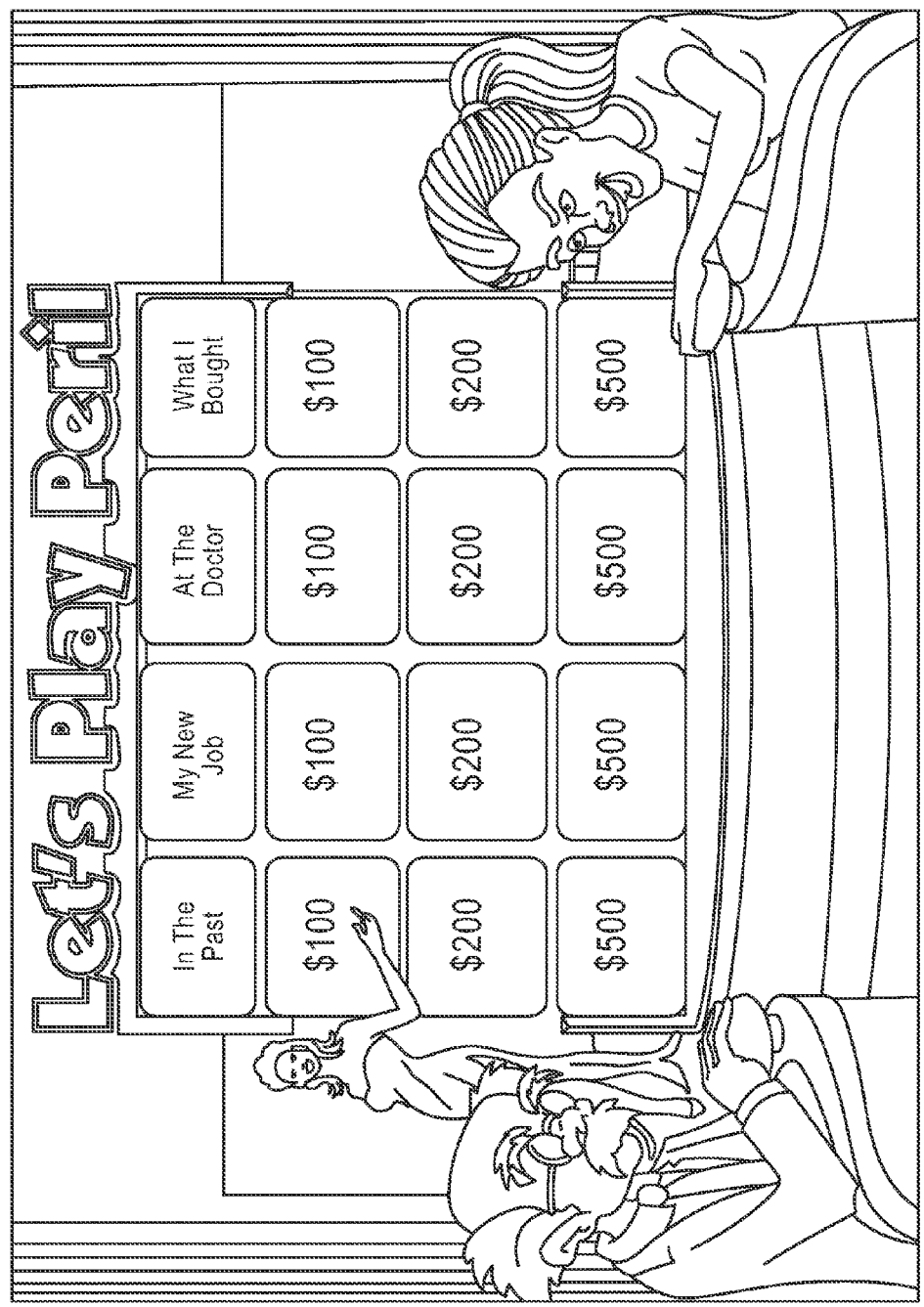
FIGS. 13-17 illustrate the operation of another example application according to an example embodiment of the present invention.
Figure 14:
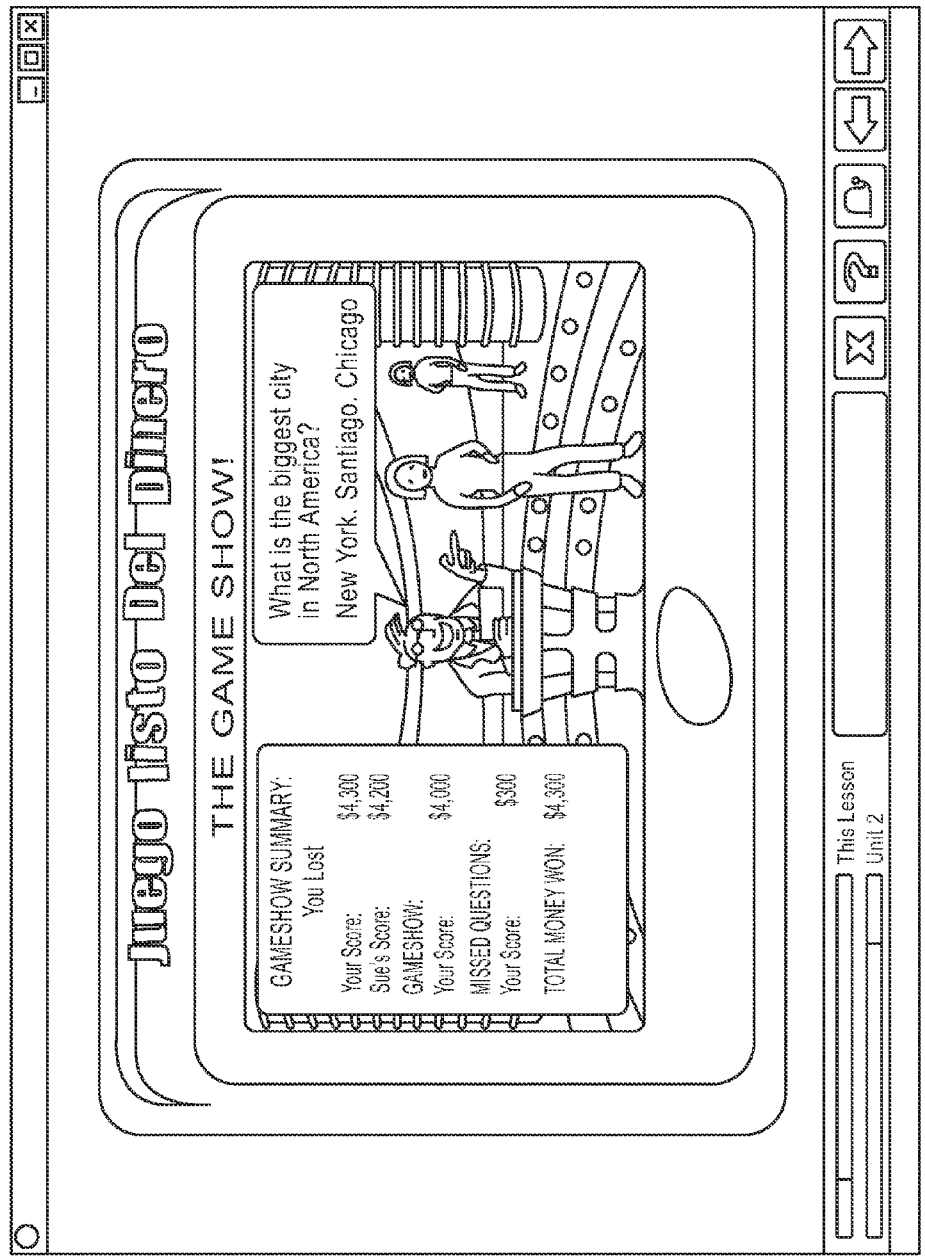
Figure 15:
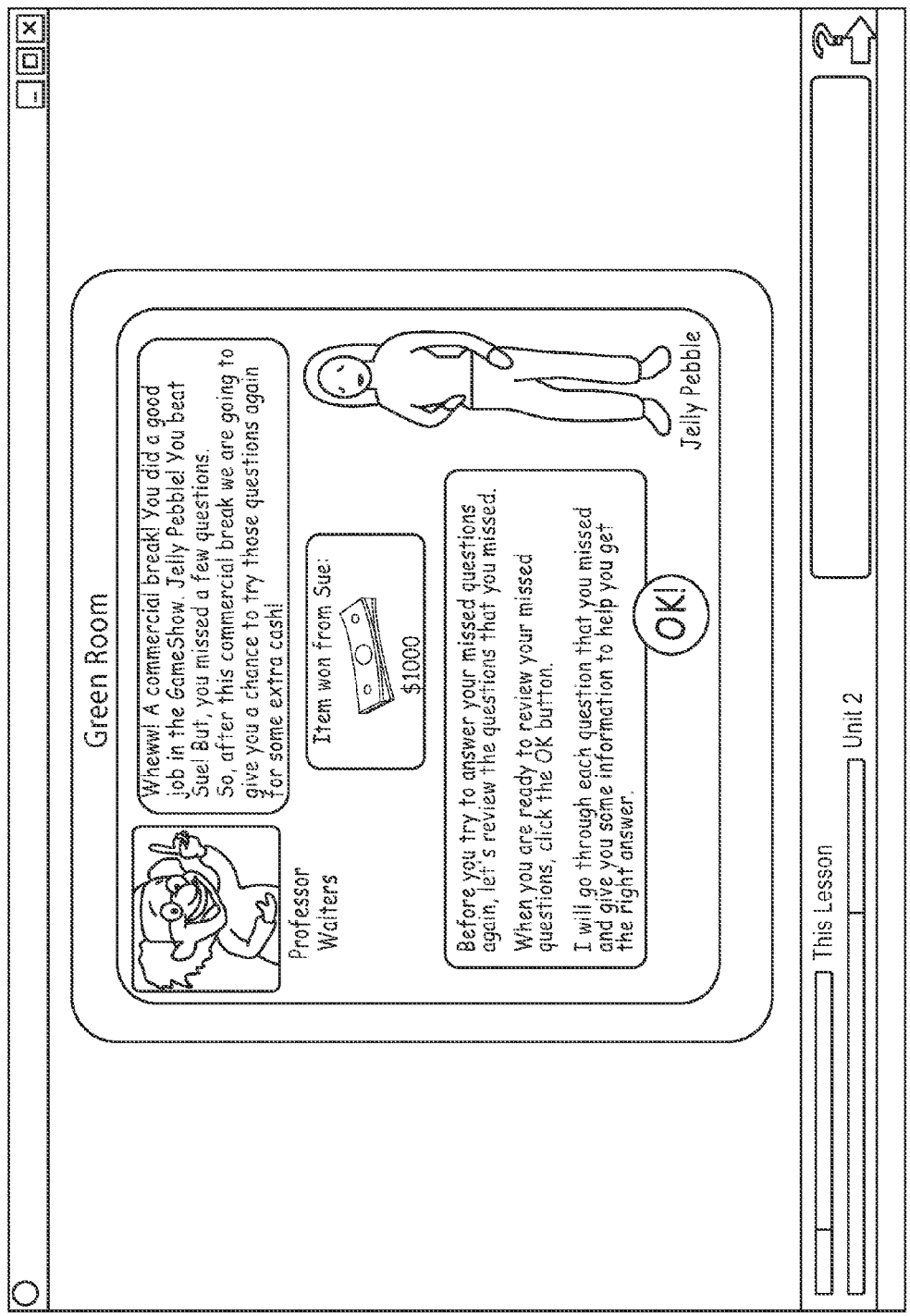
Figure 16:
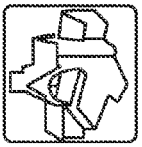
Figure 17:
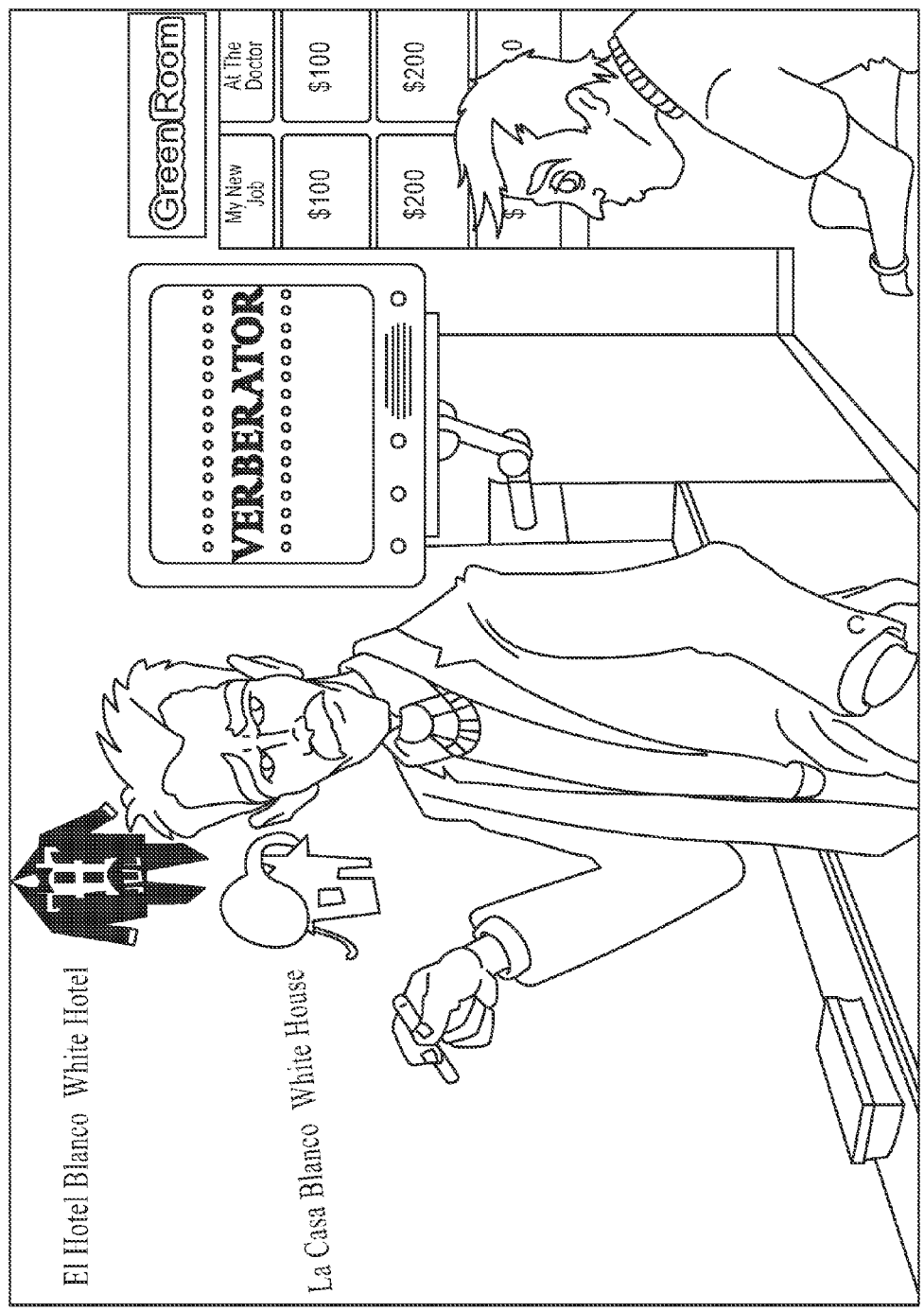

FIGS. 13-17 illustrate the operation of another example application according to an example embodiment of the present invention. The example shown in this figure may be used both as an assessment tool and to reinforce material taught in the story portion. FIG. 13 illustrates the opening screen of a game that incorporates an example embodiment of the present invention. FIG. 14 illustrates a screen shot of a game that may be used as an assessment and reinforcement mechanism, according to an example embodiment of the present invention. FIG. 15 illustrates a screen shot at the end of a game, according to an example embodiment of the present invention. The screen in FIG. 15 appears at the end of the game played, and directs the user to a tutorial to review his mistakes before playing the game again. FIGS. 16-17 illustrate screen shots that appear after a game has been played. The user is led through a tutorial to help him with specific mistakes that he made during operation of the game. A user's performance in the quiz may be monitored and used to update an estimate of the user's proficiency, including both a general proficiency estimate and a specific proficiency estimate for particular vocabulary or concepts.

FIGS. 18A-G illustrate the operation of another example application according to an example embodiment of the present invention. The series of screen shots illustrated in FIGS. 18A-G show dialogues in increasing proficiency levels in the target foreign language Spanish. The words presented in the target foreign language, in this example Spanish, appear in boldface text. FIG. 18A illustrates a sample dialogue presented to the user at a low proficiency level. FIG. 18B illustrates a sample dialogue presented to the user at a low-medium proficiency level. FIG. 18C illustrates a sample dialogue presented to the user at a medium-low proficiency level. FIG. 18D illustrates a sample dialogue presented to the user at a medium proficiency level. FIG. 18E illustrates a sample dialogue presented to the user at a medium-high proficiency level. FIG. 18F illustrates a sample dialogue presented to the user at a high-medium proficiency level. FIG. 18G illustrates a sample dialogue presented to the user at a high proficiency level. The user will be presented with the appropriate dialogue, depending on his personal proficiency level as determined by the FLLT. When a predetermined level of proficiency is reached, the base language (e.g., English words with English grammar) with target foreign language (e.g., Spanish) words and phrases substitutions may be replaced by a target foreign language text (e.g., Spanish words with Spanish grammar) with base language (e.g., English) words and phrases substitutions. Thus, at a particular point, English grammar may be replaced by Spanish grammar. Alternatively, different grammatical elements may be changed from the base to the target foreign language at different assessment points, e.g., verb position at one point, noun-adjective relationships at one point, form of interrogatories at one point, etc. Additional aids may be provided to assist the user in acquiring familiarity and understanding with the newly introduced grammatical elements. For example, a "flip" button may be provided that allows an animated display of word order change to be illustrated. Alternatively particular parts of speech may be color-coded so that their corresponding positions in the two word audios are easily identified.

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A processor-readable medium storing code representing instructions configured to cause a processor to perform a process, the code comprising code to:

deliver a video presentation simultaneously to a plurality of users;

produce a plurality of mixed known language-foreign language streams, the plurality of mixed known language-foreign language streams including a first mixed known language-foreign language stream having a first grammar syntax and a second mixed known language-foreign language stream having a second grammar syntax; and deliver simultaneously the first mixed known language-foreign language stream to a first user from the plurality of users and the second mixed known language-foreign language stream to a second user from the plurality of users, the first user having a proficiency different than a proficiency of the second user, each of the plurality of mixed known language-foreign language streams corresponding to the video presentation.

2. The processor-readable medium of claim 1, wherein the first mixed known language-foreign language stream includes at least one of an audio stream or a text stream.

3. The processor-readable medium of claim 1, wherein the first mixed known language-foreign language stream includes an audio portion having a first proportion of foreign language words and a text portion having a second proportion of foreign language words.

4. The processor-readable medium of claim 1, wherein the plurality of mixed known language-foreign language streams include mixed known language-foreign language streams with respectively varying proportions of foreign language words.

5. The processor-readable medium of claim 1, wherein the video presentation is delivered in a movie theatre.

6. The processor-readable medium of claim 1, the code further comprising code representing instructions configured to cause the processor to:

receive an input associated with a target foreign language from the first user from the plurality of users, the code representing instructions to cause the processor to produce the plurality of mixed known language-foreign language streams includes code to produce the first mixed known language-foreign language stream from the plurality of mixed known language-foreign language streams to include the target foreign language based at least in part on the input from the first user.

7. The processor-readable medium of claim 1, the code further comprising code representing instructions configured to cause a processor to:

receive an input associated with a desired difficulty level for a target foreign language from the first user from the plurality of users, the code representing instructions to cause the processor to produce the plurality of mixed known language-foreign language streams includes code to produce the first mixed known language-foreign language stream from the plurality of mixed known language-foreign language streams having a desired difficulty level based at least in part on the input from the first user.

8. The processor-readable medium of claim 1, the code further comprising code representing instructions configured to cause a processor to:

receive an input associated with a desired difficulty level for a foreign language, the code representing instructions to cause the processor to produce the plurality of mixed known language-foreign language streams includes code to select the first mixed known language-foreign language stream having an amount of the foreign language from a database containing the plurality of mixed known language-foreign language streams based at least in part on the input.

9. The processor-readable medium of claim 1, wherein the code representing instructions to cause the processor to deliver the video presentation includes code to deliver the video presentation to each user from the plurality of users via an individual video presentation device.

10. The processor-readable medium of claim 1, the code further comprising code representing instructions configured to cause the processor to:

deliver an audio stream associated with the video presentation, the audio stream being in a target foreign language.

11. The processor-readable medium of claim 1, the code further comprising code representing instructions configured to cause the processor to:

deliver an audio stream associated with the video presentation, the audio stream being in a known language.

12. The processor-readable medium of claim 1, wherein:

the first mixed known language-foreign language stream from the plurality of mixed known language-foreign language streams includes a first mixed known language-foreign language subtitle corresponding to the video presentation; and the second mixed known language-foreign language stream from the plurality of mixed known language-foreign language streams includes a second mixed known language-foreign language subtitle corresponding to the video presentation, the second mixed known language-foreign language subtitle different from the first mixed known language-foreign language subtitle.

13. The processor-readable medium of claim 1, wherein:

the first grammar syntax is a grammar syntax associated with a known language; and the second grammar syntax is a grammar syntax associated with a foreign language.

14. The processor-readable medium of claim 1, wherein:

the first grammar syntax includes at least one of a verb position associated with a known language, a noun-adjective relationship associated with the known language or an interrogatory format associated with the known language; and the second grammar syntax includes at least one of a verb position associated with a foreign language, a noun-adjective relationship associated with the foreign language or an interrogatory format associated with the foreign language.

15. The processor-readable medium of claim 1, wherein:

the first mixed known language-foreign language stream includes an audio stream having a plurality of known language words and a plurality of foreign language words, the code representing instructions configured to cause the processor to deliver the first mixed known language-foreign language stream includes code configured to adjust at least one of a pitch or an intonation associated with the plurality of foreign language words.

16. The processor-readable medium of claim 1, wherein the code representing instructions configured to cause the processor to produce a plurality of mixed known language-foreign language streams includes code to dynamically produce the first known language-foreign language stream based on individualized proficiency data associated with the first user.

17. The processor-readable medium of claim 1, wherein:

the code representing instructions to cause the processor to deliver the video presentation includes code to deliver the video presentation to the first user via a first video screen and the second user via a second video screen; and the code representing instructions configured to cause the processor to deliver simultaneously the first mixed known language-foreign language stream to a first user from the plurality of users and the second mixed known language-foreign language stream to a second user from the plurality of users includes code to deliver a text portion of the first mixed known language-foreign language stream to the first video screen and a text portion of the second mixed known language-foreign language stream to the second video screen.

18. A system, comprising:

an entertainment module configured to deliver a video presentation to a display device to simultaneously display the video presentation to a plurality of users, the entertainment module configured to deliver a plurality of mixed known language-foreign language streams to a plurality of output devices configured to simultaneously deliver the plurality of mixed known language-foreign language streams to the plurality of users, the plurality of mixed known language-foreign language streams including a first mixed known language-foreign language stream having a grammar syntax associated with a known language and a second mixed known language-foreign language stream having a grammar syntax associated with a foreign language, each of the plurality of mixed known language-foreign language streams corresponding to the video presentation, the entertainment module configured to selectively deliver one of the first mixed known language-foreign language stream or the second mixed known language-foreign language stream to an output device from the plurality of output devices associated with a user based, at least in part, on a proficiency level of the user associated with the foreign language.

19. The system of claim 18, wherein:
the first mixed known language-foreign language stream and the second mixed known language-foreign language stream each include an audio stream; and
the output device from the plurality of output devices is configured to present the audio stream to the user.

20. The system of claim 18, wherein:
the first mixed known language-foreign language stream and the second mixed known language-foreign language stream each include a text stream; and
the output device from the plurality of output devices is configured to present the text stream to the user.

21. The system of claim 18, wherein:
the entertainment module is configured to receive an input from the user associated with a desired difficulty level for a mixed known language-foreign language stream to be delivered to the output device,
the entertainment module configured to selectively deliver one of the first mixed known language-foreign language stream or the second mixed known language-foreign language stream to the output device from the plurality of output devices based, at least in part, on the input.

22. The system of claim 18, wherein:
the entertainment module is configured to receive an input from the user associated with a target foreign language,
the entertainment module configured to selectively deliver a mixed known language-foreign language stream from the plurality of mixed known language-foreign language streams including words from the target foreign language based on the input.

23. The system of claim 18, wherein:
the entertainment module is configured to retrieve the video presentation from a content database configured to store a plurality of video presentations.

24. The system of claim 18, wherein:
the entertainment module is configured to retrieve at least the first mixed known language-foreign language stream or the second mixed known language-foreign language stream from a content database configured to store the plurality of mixed known language-foreign language streams corresponding to the video presentation.

25. The system of claim 18, wherein the entertainment module is configured to produce dynamically the first known language-foreign language stream based on individualized proficiency data associated with the first user, the second known language-foreign language stream being one of a plurality of predefined known language-foreign language streams.

26. The system of claim 18, wherein:
the first mixed known language-foreign language stream includes an audio stream having a plurality of known language words and a plurality of foreign language words; and
the entertainment module is configured to adjust at least one of a pitch or an intonation associated with the plurality of foreign language words.

27. The system of claim 18, wherein:
the grammar syntax of the known language includes at least one of a verb position associated with the known language, a noun-adjective relationship associated with the known language or an interrogatory format associated with the known language; and
the grammar syntax of the foreign language includes at least one of a verb position associated with the foreign language, a noun-adjective relationship associated with the foreign language or an interrogatory format associated with the foreign language.

28. A processor-readable medium storing code representing instructions configured to cause a processor to perform a process, the code comprising code to:
deliver simultaneously a video presentation to a first video screen associated with a first user and a second video screen associated with a second user;
select a first mixed known language-foreign language stream associated with the first user based, at least in part, on a proficiency level of the first user associated with a foreign language, the first mixed known language-foreign language stream having a first grammar syntax;
select a second mixed known language-foreign language stream associated with the second user based, at least in part, on a proficiency level of the second user associated with the foreign language, the second mixed known language-foreign language stream having a second grammar syntax different than the first grammar syntax; and
deliver simultaneously a text portion of the first mixed known language-foreign language stream to the first video screen and a text portion of the second mixed known language-foreign language stream to the second video screen.

29. The processor-readable medium of claim 28, wherein:
the first grammar syntax includes at least one of a verb position associated with a known language, a noun-adjective relationship associated with the known language or an interrogatory format associated with the known language; and
the second grammar syntax includes at least one of a verb position associated with the foreign language, a noun-adjective relationship associated with the foreign language or an interrogatory format associated with the foreign language.

* * * * *